(12) United States Patent
Carter et al.

(10) Patent No.: US 6,431,953 B1
(45) Date of Patent: Aug. 13, 2002

(54) CMP PROCESS INVOLVING FREQUENCY ANALYSIS-BASED MONITORING

(75) Inventors: Phillip W. Carter, Naperville; Jeffrey P. Chamberlain, Aurora, both of IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 09/934,106

(22) Filed: Aug. 21, 2001

(51) Int. Cl.[7] .............................................. B24B 49/00
(52) U.S. Cl. .................... 451/5; 451/8; 451/9; 451/10; 451/41; 451/60; 451/287; 451/288
(58) Field of Search .............................. 451/5, 8, 9, 10, 451/41, 60, 287, 288

(56) References Cited

U.S. PATENT DOCUMENTS

| | | |
|---|---|---|
| 5,667,424 A | 9/1997 | Pan |
| 5,904,609 A * | 5/1999 | Fukuroda et al. ............... 451/8 |
| 5,905,572 A | 5/1999 | Li |
| 6,040,672 A * | 3/2000 | Schudel et al. ............. 318/611 |
| 6,041,287 A | 3/2000 | Dister et al. |
| 6,077,783 A | 6/2000 | Allman et al. |
| 6,081,330 A | 6/2000 | Nelson et al. |
| 6,172,756 B1 | 1/2001 | Chalmers et al. |
| 6,179,688 B1 | 1/2001 | Beckage et al. |
| 6,204,922 B1 | 3/2001 | Chalmers et al. |
| 6,241,847 B1 | 6/2001 | Allman et al. |
| 6,334,807 B1 * | 1/2002 | Lebel et al. .................... 451/6 |

* cited by examiner

*Primary Examiner*—Timothy V. Eley
*Assistant Examiner*—Shantese McDonald

(57) ABSTRACT

The invention provides a method, for monitoring a chemical-mechanical polishing process, comprising receiving a real-time data signal from a chemical-mechanical polishing process, wherein the real-time data signal pertains to a frictional force, torque, or motor current, converting the data signal into a power spectrum of signals with different frequencies whose sum equals that of the original data signal, identifying and monitoring the signal components of the power spectrum corresponding to an aspect of the chemical-mechanical polishing process, detecting a change in the amplitude or frequency of the signal component, and altering the chemical-mechanical polishing process in response to the detected change. The invention also provides an apparatus for carrying out the aforementioned method.

23 Claims, 4 Drawing Sheets

CMP PROCESS INVOLVING FREQUENCY ANALYSIS-BASED MONITORING

FIELD OF THE INVENTION

This invention pertains to chemical-mechanical polishing and a method of monitoring the polishing process.

BACKGROUND OF THE INVENTION

Chemical-mechanical polishing ("CMP") processes are used in the manufacturing of microelectronic devices to form flat surfaces on semiconductor wafers, field emission displays, and many other microelectronic substrates. For example, the manufacture of semiconductor devices generally involves the formation of various process layers, selective removal or patterning of portions of those layers, and deposition of yet additional process layers above the surface of a semiconducting substrate to form a semiconductor wafer. The process layers can include, by way of example, insulation layers, gate oxide layers, conductive layers, and layers of metal or glass, etc. It is generally desirable in certain steps of the wafer process that the uppermost surface of the process layers be planar, i.e., flat, for the deposition of subsequent layers. CMP is used to planarize process layers wherein a deposited material, such as a conductive or insulative material, is polished to planarize the wafer for subsequent process steps.

In a typical CMP process, a wafer is mounted upside down on a carrier in a CMP tool. A force pushes the carrier and the wafer downward toward a polishing pad. The carrier and the wafer are rotated above the rotating polishing pad on the CMP tool's polishing table. A polishing composition (also referred to as a polishing slurry) generally is introduced between the rotating wafer and the rotating polishing pad during the polishing process. The polishing composition typically contains a chemical that interacts with or dissolves portions of the uppermost wafer layer(s) and an abrasive material that physically removes portions of the layer(s). The wafer and the polishing pad can be rotated in the same direction or in opposite directions, whichever is desirable for the particular polishing process being carried out. The carrier also can oscillate across the polishing pad on the polishing table.

The CMP process desirably results in a planar surface on a wafer with little or no detectable scratches or excess material present on the wafer surface. Precise control of wafer planarization is required during the CMP process, and it is therefore necessary to periodically, if not continuously, monitor the wafer in order to ensure sufficient but not excessive polishing of the wafer. The point at which excess material on a wafer surface is removed, but desired material remains, is called the "endpoint" of the CMP process. Overpolishing (i.e., removing too much) of a wafer can damage the wafer surface, rendering the wafer unusable. Underpolishing (i.e., removing too little) of the wafer requires that the CMP process be repeated, which is inefficient and costly. Moreover, underpolishing sometimes is not noticed, which can cause subsequent processing difficulties and eventually render the wafer unusable. The time interval between a state of underpolishing and overpolishing can be small, e.g., on the order of a few seconds. Thus, accurate in situ endpoint detection is highly desirable.

While the polishing endpoint for a substrate can be estimated using the polishing endpoint for a previous substrate of the same type, the estimated endpoint may not be accurate because polishing conditions can change. Similarly, removing the substrate from the polishing pad and substrate carrier and measuring the change in thickness of the substrate in an effort to determine the polishing endpoint is time-consuming and can damage the substrate, thus reducing the throughput of the CMP process.

Standard techniques currently used for in situ endpoint detection include optical reflection, thermal detection, and friction-based techniques. Optical reflection techniques encounter higher levels of signal noise as the number of process layers increases, thereby decreasing the accuracy of endpoint detection to a point where the endpoint cannot be detected. Optical reflection techniques may also require that the wafer be moved off the edge of the polishing table, thus interrupting the polishing process. In addition, this can cause the endpoint to be missed and its detection delayed by perhaps as much as a few seconds, depending on oscillation speed and distance.

Thermal imaging involves the remote sensing of temperature across the wafer using techniques such as pyrometry, fluoroptic thermometry, and laser interferometric thermometry. Thermal techniques suffer from thermal noise caused by variations in the wafer production rate, variations in the polishing composition, or changes in the polishing pad. Thermal techniques are also adversely impacted by complexity in the thermal variations as the CMP tool warms and cools over the operation cycle and carrier arm oscillations.

Friction-based techniques detect the endpoint by monitoring the change in the friction coefficient between the substrate surface and the polishing pad. For example, the coefficient of friction is different for a conductive metal sliding on the polishing pad versus an insulating oxide sliding on the polishing pad. The level of friction can be measured by several methods including monitoring the friction force, monitoring the power consumed by the CMP tool's carrier or platen motor, or by measuring the changes in torque of the carrier shaft. Friction-based techniques are satisfactory when there is a significant change in friction as the underlying layer is exposed; however, they also have their drawbacks. For many applications, the change in friction associated with the interface between layers is too small to result in a change sufficient to be a reliable indicator of the CMP process endpoint. This is particularly a problem when there is little difference between the materials of two layers. For example, a small pattern factor (that is, a relatively small area of the underlying patterned layer, compared with the area of the entire layer) causes only a small change in friction as the endpoint is reached, thereby limiting the useful signal. The problem can be further compounded by a large noise component. Indeed, even with filtering, the power signals may have complex shapes that mask the relatively simple change caused when the endpoint is reached.

Accordingly, there remains a need for an improved method of monitoring the polishing process. The invention provides a method and apparatus that address at least some of the aforementioned problems. These and other advantages of the invention, as well as additional inventive features, will be apparent from the description of the invention provided herein.

BRIEF SUMMARY OF THE INVENTION

The invention provides a method for monitoring a chemical-mechanical polishing process comprising receiving a real-time data signal from a chemical-mechanical polishing process, wherein the real-time data signal pertains to a frictional force, torque, or motor current, submitting the data signal to an algorithm that separates the data signal into a power spectrum of signals with different frequencies, identifying at least one signal component of the power spectrum corresponding to an aspect of the chemical-mechanical polishing process, monitoring the signal component of the power spectrum during the chemical-mechanical polishing process for a change in the amplitude or frequency, detecting a change in the amplitude or frequency of the signal component, and altering the chemical-mechanical polishing process in response to the detected change. The invention also provides an apparatus for chemically-mechanically polishing a substrate comprising a chemical-mechanical polishing tool that generates a real-time data signal, wherein the realtime data signal pertains to a frictional force, torque, or motor current, a sensor that transmits the real-time data signal, a data collection unit that receives the real-time data signal, and a signal analysis unit that (i) performs an algorithm on the real-time data signal, (ii) detects a change in the amplitude or frequency of a signal component, and (iii) responds to the detected change to cause an alteration of the chemical-mechanical polishing process.

DETAILED DESCRIPTION OF THE INVENTION

Figure 1:
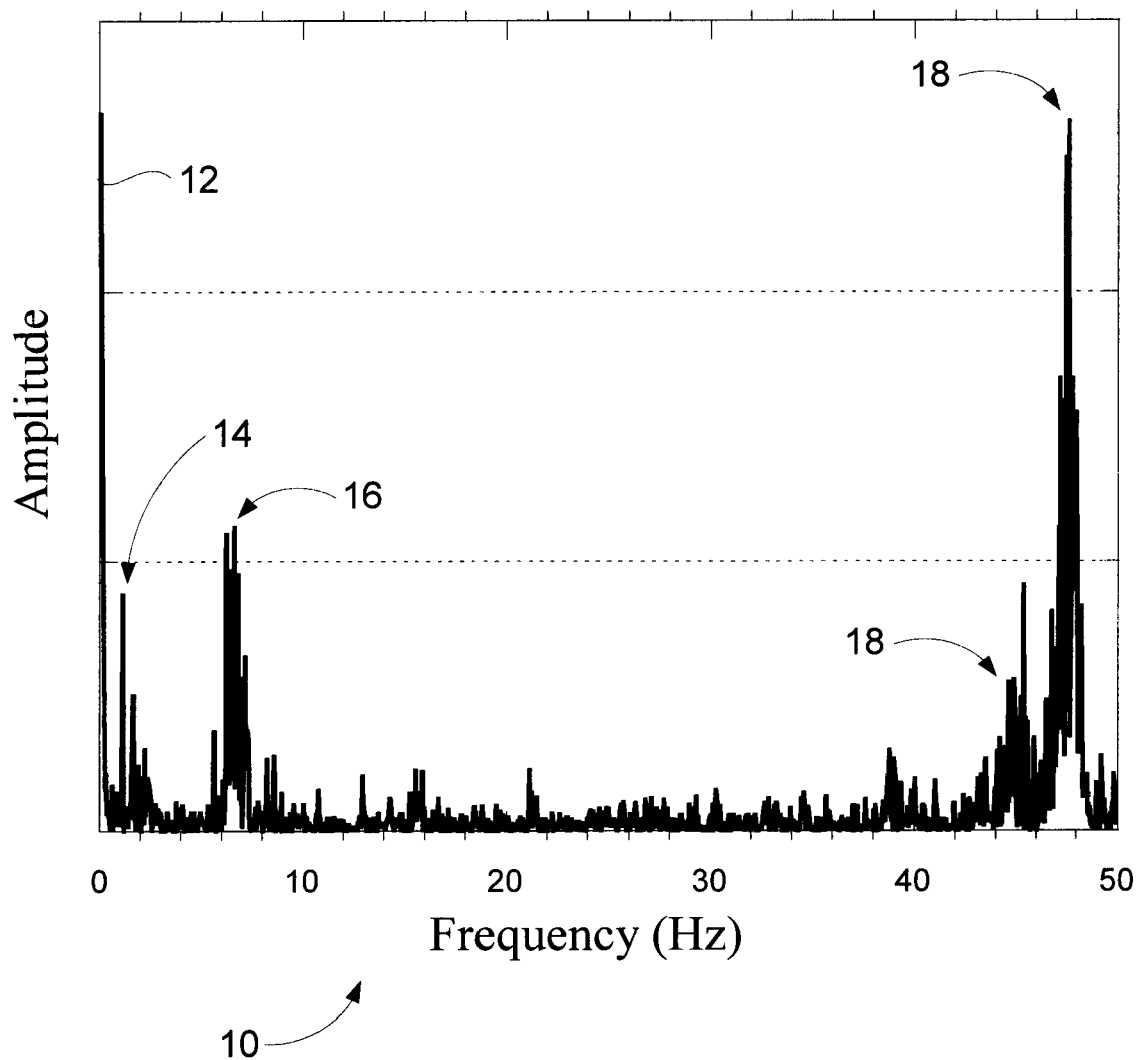
FIG. 1 is a graph of frequency versus amplitude that depicts a power spectrum derived from a friction force data signal illustrating different signal components corresponding to the CMP process.

The invention is a method and an apparatus for in situ monitoring of a chemical-mechanical polishing (CMP) process. The method involves receiving a real-time data signal from a CMP process and transforming the real-time data signal into a power spectrum (e.g., plot of frequency versus amplitude) of signal components with different frequencies, whose sum is equal to that of the real-time data signal. The individual signal components correspond to the different aspects of the CMP process that contribute to the original data signal. By monitoring the signal components for changes in amplitude and/or frequency during the CMP process, important events in the CMP process requiring an alteration of the CMP process can be detected. In particular, when a change in amplitude and/or frequency in at least one signal component is detected, the CMP process can be altered in response to the detected change as appropriate to ensure that the substrate being polished is properly processed.

The real-time data signal can be any suitable CMP process data signal, such as any bulk data signal measured during a CMP process, which through decomposition would allow in situ monitoring of signal components indicative of CMP events. Thus, the real-time data signal can be the friction force of the substrate carrier on the polishing pad, the torque from the carrier shaft, or motor current (platen or carrier).

Any suitable algorithm can be used to convert the real-time data signal into its constituent signal components given as a power spectrum, whereby the individual signal components can be identified and monitored in real-time. Preferably, the data signal is transformed into its various signal components in a power spectrum by a mathematical algorithm. In one embodiment of the invention, the algorithm is fast Fourier transform (FFT). In another embodiment, the algorithm is a fast wavelet transform. Using a fast transform allows for real-time processing of the information relevant to the chemical-mechanical polishing process.

At least one signal component is identified as corresponding to an aspect of the CMP process. For example, one or more of the individual signal components can be identified based on amplitude and/or frequency as pertaining to carrier rotation, platen rotation, tool vibration, and polishing composition flow. By separating the data signal into different components, a signal component of interest can be observed and monitored without interference from other signal components, i.e., "background noise." At least one of the individual signal components is monitored in real-time, i.e., during the CMP process.

Two or more of the signal components can be monitored in tandem. The amplitude and/or frequency information from two or more individual signal components also can be combined in any suitable way so as to more accurately observe a desired change. Moreover, one or more individual signal components obtained from one type of data signal can be combined with one or more individual signal components obtained from a different type of data signal in any way so as to more accurately observe a desired change.

The detection of a change in the amplitude and/or frequency of at least one signal component can be accomplished by any suitable technique. Similarly, the CMP process can be altered in response to the detected change by any suitable technique.

The method of the invention is preferably used in the polishing of semiconductor substrates; however, the invention can be used in conjunction with the chemical-mechanical polishing of any suitable substrate, particularly any microelectronic device. Such microelectronic devices include field emission devices, rigid memory disks, magnetic heads, and other similar items.

The method can be used to monitor a variety of chemical-mechanical polishing aspects. For example, a detected change in the signal component amplitude or frequency can be in response to or be indicative of an aspect of polishing process, such as polishing endpoint, polishing pad wear, undesirable vibration in the polishing process, substrate defect, and/or a change in the application of the polishing composition to the polishing pad. The invention provides for the in situ monitoring and diagnosis of all aspects and events relevant to the chemical-mechanical polishing process. In a preferred embodiment, the method is used for polishing endpoint detection.

The inventive method is carried out using any suitable chemical-mechanical polishing apparatus. The invention provides a chemical-mechanical polishing apparatus comprising a chemical-mechanical polishing tool, at least one sensor, at least one data collection unit, and at least one signal analysis unit.

The chemical-mechanical polishing tool generates a real-time data signal. The CMP tool can be any suitable CMP tool, such as a conventional tool known in the art. Preferably, the CMP tool comprises at least one polishing pad that contacts and moves relative to a substrate to be polished and at least one conduit for applying a polishing composition to the polishing pad. Multiple CMP tools may be present in the CMP apparatus.

The sensor transmits the real-time data signal to a data collection unit. The sensor that transmits the real-time data signal can be any suitable sensor device, many of which are known in the art. For example, the friction force of the carrier arm can be obtained and transmitted using a force gauge. The torque of the carrier shaft can be obtained and transmitted using a strain gauge. The motor current from the platen or carrier motor can be obtained and transmitted using Hall effect probes or mechanically clamping sensors. Multiple sensors transmitting the same or different real-time data signals can be present in the CMP apparatus.

The data collection unit receives the real-time data signal from the sensor. The data signal can be a data signal pertaining to frictional force, torque (e.g., carrier shaft torque), or motor current (e.g., platen or carrier motor current). The data collection unit may receive multiple data signals in parallel. Also, multiple data collection units may be present in the CMP apparatus.

The signal analysis unit performs an algorithm on the real-time data signal to generate (e.g., transform it into) a power spectrum of signal components with different frequencies whose sum equals that of the real-time data signal. The signal analysis unit is used to monitor the power spectrum as a function of time and detect any changes in the amplitude or frequency of the signal components in the power spectrum. A change in the amplitude or frequency of at least one signal component indicative of an aspect (e.g., an event) in the CMP process is detected by the signal analysis unit. The signal analysis unit then responds to the detected change in such a way that the chemical-mechanical polishing process is altered. A change in the chemical-mechanical polishing process can be effected in any suitable manner. For example, the response by the signal analysis unit may include delivering a signal to alert an operator controlling the CMP process or initiating an appropriate program sequence, either of which results in an alteration in the chemical-mechanical polishing process. Multiple signal analysis units may be present in the CMP apparatus.

In a preferred embodiment, the CMP apparatus comprises a programmable computer exchanging signals with the CMP tool over a bus system. The programmable computer can be any computer suitable to the task and can include a personal computer (desktop or laptop), a workstation, a network server, or a mainframe computer. The computer can operate under any suitable operating system, such as Windows®, MS-DOS, OS/2, UNIX, or Mac OS. The bus system can operate pursuant to any suitable or convenient bus or network protocol. Exemplary network protocols include Ethernet, RAMBUS, Firewire, token ring, and straight bus protocols. Some embodiments may also employ one or more serial interfaces, e.g., 125232, SEGS, or GEM. As will be recognized by those in the art having the benefit of this disclosure, the appropriate types of computer, bus system, and CMP tool will depend on the particular implementation and concomitant design constraints, such as cost and availability.

The discussion herein of the real-time data signal and its manipulation and ultimate effect on the chemical-mechanical polishing process in the context of the inventive method also is applicable to the inventive apparatus. Similarly, the discussion herein of other aspects of the inventive method, e.g., suitable substrates to be subjected to monitored chemical-mechanical polishing, is applicable to the inventive apparatus, as appropriate.

The following examples further illustrate the invention but, of course, should not be construed as in any way limiting its scope.

EXAMPLE 1

This example illustrates that a power spectrum can be obtained during a chemical-mechanical polishing process by transforming a CMP real-time data signal into its various signal components.

A conventional tabletop chemical-mechanical polisher was provided with a strain gauge attached to the substrate carrier arm to measure the frictional force between the polishing pad and the substrate as a function of time. A nickel phosphide substrate was polished in the chemical-mechanical polisher with a standard buff polishing pad using a silica-containing polishing composition. The CMP process parameters were as follows: downforce pressure=9.7 kPa (1.4 psi), platen speed 60 rpm, carrier speed=2 rpm, and polishing composition flow rate=90 ml/min. The fictional force data signal at a particular point in time was separated using a fast Fourier transform (FFT) into a power spectrum, which is depicted in FIG. 1. As show in FIG. 1, the power spectrum (10) of the frictional force data signal shows distinct regions of contribution to friction associated with the carrier rotation (12), platen rotation (14), and tool vibration (16 and 18). The tool vibration components are more specifically associated with a "stick-slip" resonance of the substrate to the polishing pad at ~5–15 Hz (16) and with tool resonance at ~40–60 Hz (18). The frequencies depicted in FIG. 1 were limited by the strain gauge response times of ~2 milliseconds. The sampling rate was therefore restricted to 200 Hz with a highest FFT frequency of 100 Hz.

This example demonstrates that a complex real-time data signal can be converted into a power spectrum containing individual signal components corresponding to different aspects of the chemical-mechanical polishing process. Moreover, the individual signal components can be individually identified on the basis of their different frequencies and amplitudes. Although this example involved the creation of a power spectrum derived from a friction force data signal, such a power spectrum can be obtained using any appropriate data signal.

EXAMPLE 2

This example illustrates the monitoring of at least one signal component of a power spectrum during a chemical-mechanical polishing process for a change in the amplitude or frequency of the signal component as a function of time.

Figure 2:
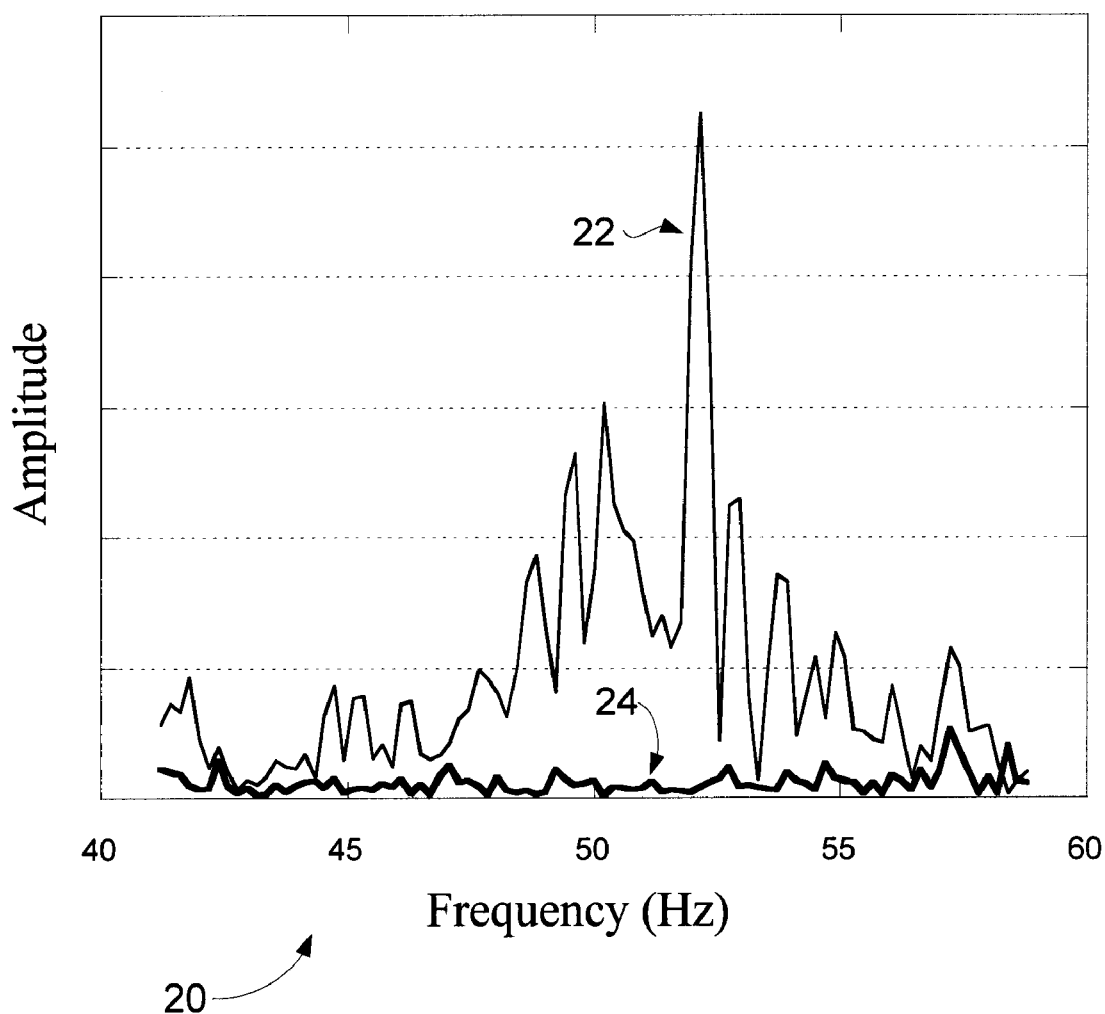
FIG. 2 is a graph of frequency versus amplitude that depicts a power spectrum derived from a friction force data signal illustrating a change in the amplitude of the CMP tool vibration signal component as a function of polishing time.

The same CMP apparatus described in Example 1 was utilized to chemically-mechanically polish a nickel phosphide substrate in the same manner as described in Example 1, except that the CMP process parameters were as follows: downforce pressure=9.0 kPa (1.3 psi), platen speed=60 rpm, carrier speed=0 rpm, and polishing composition flow rate= 90 ml/min. The fictional force data signal at two different points in time was separated in the same manner as in Example 1 into two power spectrums, which are depicted in FIG. 2. As shown in FIG. 2, the power spectrum (20) highlights the tool vibration signal component region identified in Example 1, as recorded after 10 seconds (22) and after 160 seconds (24). The tool vibration signal component initially had considerable amplitude, indicating a high degree of friction between the polishing pad and the substrate. As the polishing process continued, the amount of friction decreased, reflected by reduced amplitude in the tool vibration signal component. Indeed, the tool vibration signal component, after 160 seconds, had almost no amplitude, thereby indicating that the polishing pad and the substrate had become smooth.

This example demonstrates that the amplitude and/or frequency of a particular signal component of a power spectrum can be monitored as a function of time such that a change indicative of an event in the chemical-mechanical polishing process can be detected. Although this example illustrates only a change in the tool vibration component as derived from a friction force data signal, any signal component from any appropriate data signal can be monitored as a function of time.

EXAMPLE 3

This example illustrates that the amplitude and/or frequency of a signal component of a power spectrum is sensitive to different polishing conditions in the chemical-mechanical polishing process.

Figure 3:
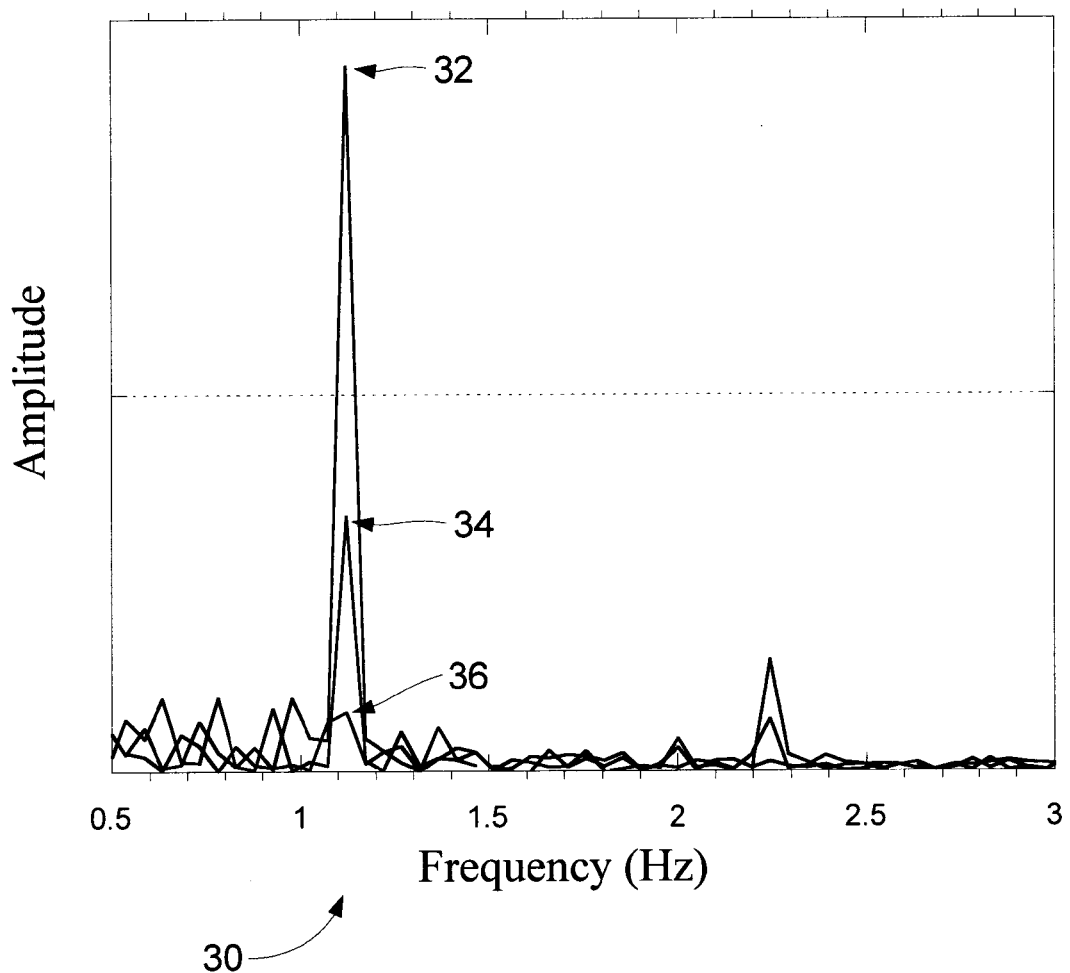
FIG. 3 is a graph of frequency versus amplitude that depicts a power spectrum derived from a friction force data signal illustrating the effect of the type of polishing composition on the amplitude of platen rotation signal component.

The same CMP apparatus described in Example 1 was utilized to chemically-mechanically polish a nickel phosphide substrate in the same manner as described in Example 1, except that three different silica-containing polishing compositions were used and the CMP process parameters were as follows: downforce pressure=9.7 kPa (1.4 psi), platen speed=60 rpm, carrier speed=8 rpm, and polishing composition flow rate=90 ml/min. The frictional force data signals for the three polishing compositions at the same relative point in time were separated in the same manner as in Example 1 into three corresponding power spectrums, which are depicted in FIG. 3. As shown in FIG. 3, the power spectrum (30) highlights the platen rotation signal component identified in Example 1 for the three different polishing compositions (32, 34, and 36) and illustrates that the platen rotation signal is affected by the type of polishing composition used in the chemical-mechanical polishing process. The first of the three polishing compositions showed the largest coupling (i.e., highest intensity) to the platen rotation (32) in contrast to the other two polishing compositions, which demonstrated little to no coupling to the platen rotation (34 and 36). The same differences in the platen rotation signal component amplitudes as a function of polishing composition also were observed using a standard large-scale polishing tool (Straughsbaugh 6EE polishing tool). In addition, similar differences as between the three polishing compostitions were observed with respect to the tool vibration signal component. In particular, a large tool vibration signal component was observed when using the first polishing composition, while the third polishing composition exhibited no tool vibration signal component.

This example demonstrates that different polishing conditions of the chemical-mechanical polishing process can give rise to distinct and unique signal components in the power spectrum. Although this example relates to the unique changes in the platen rotation signal component of a friction force data signal, any signal component of any appropriate data signal can be used to detect changes in the polishing conditions of a chemical-mechanical polishing process.

EXAMPLE 4

This example further illustrates that the amplitude and/or frequency of a signal component of a power spectrum is sensitive to different polishing conditions in the chemical-mechanical polishing process.

Figure 4:
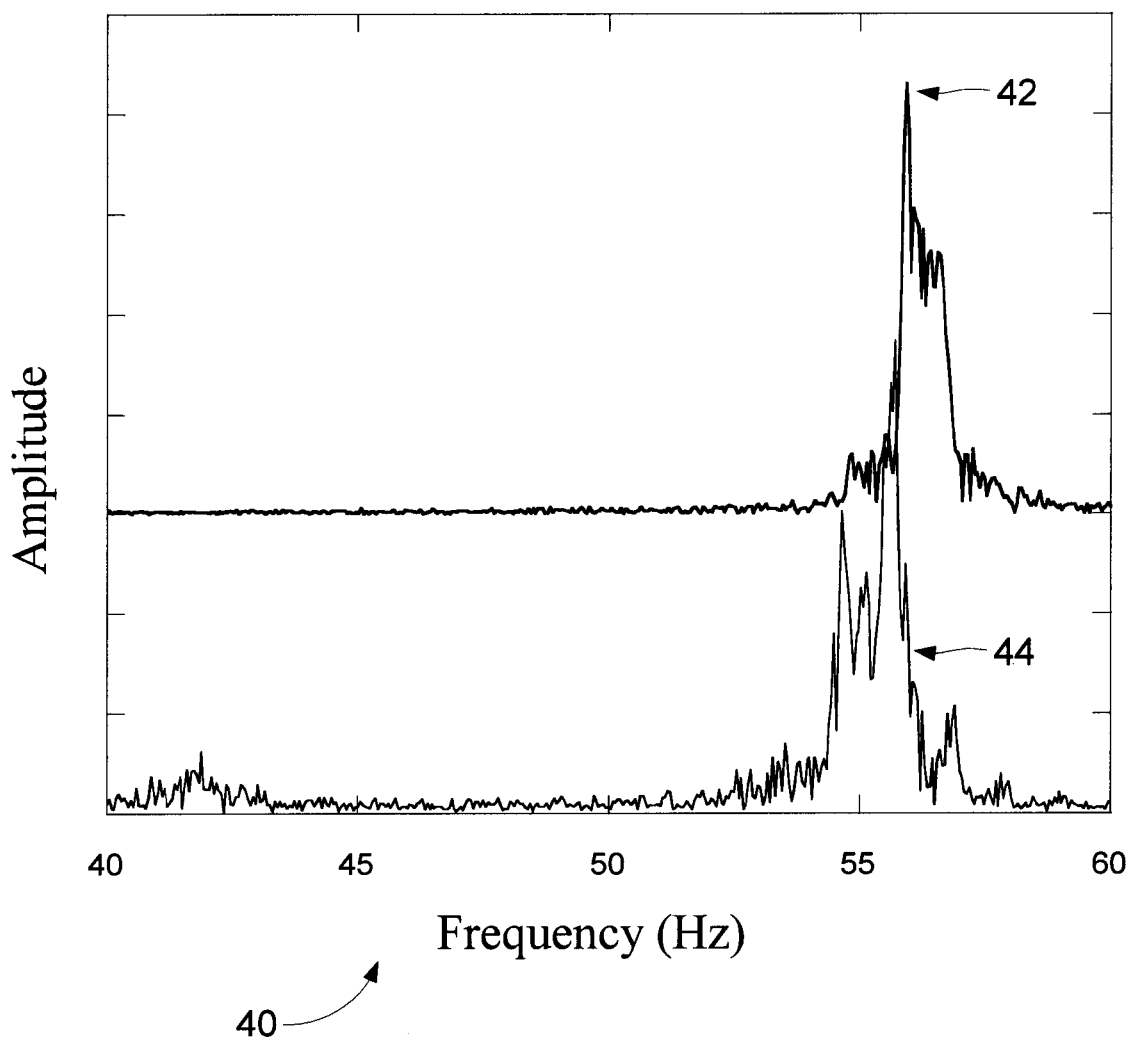
FIG. 4 is a graph of frequency versus amplitude that depicts a power spectrum derived from a friction force data signal illustrating the effect of the type of polishing composition on the frequency of CMP tool vibration signal component.

The same CMP apparatus described in Example 1 was utilized to chemically-mechanically polish a nickel phosphide substrate in the same manner described in Example 1, except that two different silica-containing polishing compositions were used and the CMP process parameters were as follows: downforce pressure=10.3 kPa (1.5 psi), platen speed=60 rpm, carrier speed=0 rpm, and polishing composition flow rate=90 ml/min. The frictional force data signals for the two polishing compositions at the same relative point in time were separated in the same manner as in Example 1 into three corresponding power spectrums, which are depicted in FIG. 4. As shown in FIG. 4, the power spectrum (40) highlights the tool vibration signal component identified in Example 1 for the two different polishing compositions (42 and 44). The tool vibration signal components of the power spectrums for the two polishing compositions (42 and 44) have unique frequency profiles indicating that the polishing compositions couple differently to the tool vibration. This example, in combination with Example 3, demonstrates that a small change in the polishing conditions can be observed in two distinct regions of the power spectrum (platen rotation and tool vibration signal components) in two different ways (change of amplitude and change in frequency). Monitoring both signal components in tandem can further improve accuracy in identifying changes in the polishing conditions, particularly with respect to the polishing composition.

This example demonstrates that, using the method of the invention, a complex data signal can be converted into signal components in a power spectrum such that changes in the polishing conditions can be accurately identified based on unique frequency signatures. Although this example relates to the unique changes in the tool vibration signal component of a friction force data signal, any signal component of any appropriate data signal can be used to detect changes in the polishing conditions of a chemical-mechanical polishing process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for monitoring a chemical-mechanical polishing process comprising:
   (a) receiving a real-time data signal from a chemical-mechanical polishing process, wherein the real-time data signal pertains to a frictional force, torque, or motor current,
   (b) submitting the real-time data signal to an algorithm that separates the data signal into a power spectrum of signals with different frequencies whose sum equals that of the real-time data signal,
   (c) identifying at least one signal component of the power spectrum corresponding to an aspect of the chemical-mechanical polishing process,
   (d) monitoring the at least one signal component of the power spectrum during the chemical-mechanical polishing process for a change in the amplitude or frequency of the signal component,
   (e) detecting a change in the amplitude or frequency of the at least one signal component, and
   (f) altering the chemical-mechanical polishing process in response to the detected change.

2. The method of claim 1, wherein the algorithm is a fast Fourier transform.

3. The method of claim 1, wherein the algorithm is a wavelet analysis.

4. The method of claim 1, wherein the chemical-mechanical polishing process comprises applying a polishing composition to a polishing pad that contacts and moves relative to a substrate to be polished.

5. The method of claim 4, wherein the substrate is a semiconductor substrate.

6. The method of claim 4, wherein the substrate is a rigid memory disk.

7. The method of claim 4, wherein the substrate is a magnetic head.

8. The method of claim 4, wherein the detected change in amplitude or frequency of the at least one signal component is indicative of polishing progress.

9. The method of claim 4, wherein the detected change in amplitude or frequency of the at least one signal component is indicative of polishing endpoint.

10. The method of claim 4, wherein the detected change in amplitude or frequency of the at least one signal component is indicative of polishing pad wear.

11. The method of claim 4, wherein the detected change in amplitude or frequency of the at least one signal component is indicative of an undesirable vibration in the polishing process.

12. The method of claim 4, wherein the detected change in amplitude or frequency of the at least one signal component is indicative of a defect in the substrate.

13. The method of claim 4, wherein the detected change in amplitude or frequency of the at least one signal component is indicative of a change in the application of the polishing composition to the polishing pad.

14. An apparatus for chemically-mechanically polishing a substrate, the apparatus comprising:
   (a) a chemical-mechanical polishing tool that generates a real-time data signal, wherein the real-time data signal pertains to a frictional force, torque, or motor current,
   (b) a sensor that transmits the real-time data signal,
   (c) a data collection unit, which receives the real-time data signal, and
   (d) a signal analysis unit, which (i) performs an algorithm on the real-time data signal to generate a power spectrum of signal components with different frequencies whose sum equals that of the real-time data signal, (ii) detects a change in the amplitude or frequency of at least one signal component, and (iii) responds to the detected change to cause an alteration of the chemical-mechanical polishing process.

15. The apparatus of claim 14, wherein the algorithm is a fast Fourier transform.

16. The apparatus of claim 14, wherein the algorithm is wavelet analysis.

17. The apparatus of claim 14, wherein the chemical-mechanical polishing tool comprises (i) a polishing pad that contacts and moves relative to a substrate to be polished, and (ii) a conduit for applying a polishing composition to the polishing pad.

18. The apparatus of claim 14, wherein the detected change in amplitude or frequency of the at least one signal component is indicative of polishing progress.

19. The apparatus of claim 14, wherein the detected change in amplitude or frequency of the at least one signal component is indicative of polishing endpoint.

20. The apparatus of claim 14, wherein the detected change in amplitude or frequency of the at least one signal component is indicative of polishing pad wear.

21. The apparatus of claim 14, wherein the detected change in amplitude or frequency of the at least one signal component is indicative of an undesirable vibration in the polishing process.

22. The apparatus of claim 14, wherein the detected change in amplitude or frequency of the at least one signal component is indicative of a defect in the substrate.

23. The apparatus of claim 14, wherein the detected change in amplitude or frequency of the at least one signal component is indicative of change in the application of the polishing composition to the polishing pad.

* * * * *